United States Patent [19]

Leo et al.

[11] Patent Number: 5,084,757
[45] Date of Patent: Jan. 28, 1992

[54] METHOD AND APPARATUS FOR MOUNTING A CATHODE RAY TUBE TO MINIMIZE TUBE SHIFT AND RESPECT TO A BEZEL

[75] Inventors: Cosmo L. Leo, Watertown; Richard M. Braun, Millis; Daniel L. Belanger, Westford, all of Mass.

[73] Assignee: Digital Equipment Corporation, Maynard, Mass.

[21] Appl. No.: 544,260

[22] Filed: Jun. 26, 1990

[51] Int. Cl.⁵ .............................................. H04N 5/645
[52] U.S. Cl. .................................................... 358/248
[58] Field of Search ................................ 358/245-249, 358/254, 229, 209

[56] References Cited

U.S. PATENT DOCUMENTS

| | | | |
|---|---|---|---|
| 2,545,348 | 3/1951 | Fabel | 177/316 |
| 2,896,200 | 7/1958 | Aeschliman | 340/267 |
| 23,428,928 | 10/1947 | Cain | 250/141 |
| 4,063,289 | 12/1977 | Veenendaal | 358/242 |
| 4,080,631 | 3/1978 | Puhak | 358/248 |
| 4,616,218 | 10/1986 | Bailey et al. | 340/720 |
| 4,651,218 | 3/1987 | Fazioli | 358/248 |
| 4,662,797 | 5/1987 | Helgeland | 358/254 |

Primary Examiner—Stephen Brinich
Attorney, Agent, or Firm—Arnold, White & Durkee

[57] ABSTRACT

In a video display terminal having a housing and a cathode ray tube mounted in the housing, there is provided shift restricting means for applying a selected level of force between mounting ears of the tube and the housing in a direction generally perpendicular to the central axis of the tube. In a preferred embodiment, angle brackets are mounted inside the housing between the enlarged end portion of the cathode ray tube and inside corners of the housing, and lateral force is applied between the angle brackets and the enlarged end portion of the tube for rigidifying the housing. The lateral force is applied by wedges mounted in the brackets for sliding against the mounting ears, and screws are coupled to the brackets for forcing the wedges against the mounting ears.

23 Claims, 5 Drawing Sheets

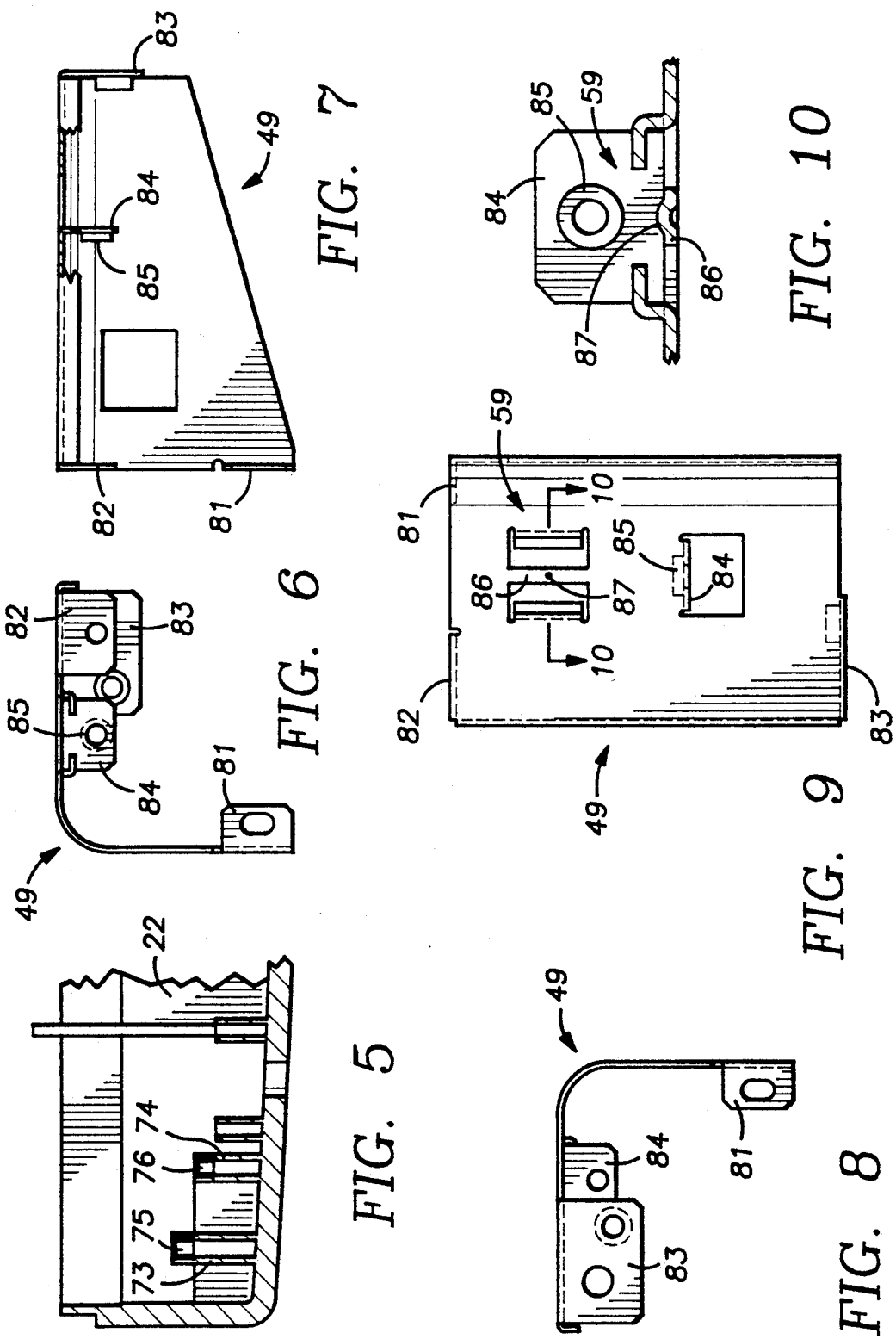

METHOD AND APPARATUS FOR MOUNTING A CATHODE RAY TUBE TO MINIMIZE TUBE SHIFT AND RESPECT TO A BEZEL

BACKGROUND OF THE INVENTION

1. Field of the Invention

The present invention relates generally to the mounting of a cathode ray tube in a housing, and more particularly to the mounting of a cathode ray tube of the kind having mounting ears at corners of the enlarged end of the tube. Specifically, the present invention relates to a mounting arrangement that applies lateral force to the tube ears to restrict shifting of the tube with respect to the bezel of the housing and to rigidify the housing.

2. Description of the Related Art

A conventional cathode ray tube has mounting ears at corners of the enlarged end of the tube. The mounting ears are secured to the glass envelope of the tube by a tensioned metallic implosion-resisting band encircling the enlarged end of the tube. For mounting the cathode ray tube in a plastic housing, each of the mounting ears is secured by a screw to a front bezel portion of the housing. Because mounting ears are set back from the display screen of the cathode ray tube, the mounting ears must be mounted at a position set back from the front of the bezel portion, and typically the bezel portion is injection molded with standoffs or "bosses" to which the mounting ears are screwed. Due to insufficient friction between the mounting ears and the fastening hardware as well as the flexibility of the mounting bosses, this mounting arrangement permits the cathode ray tube to shift laterally with respect to the housing.

In some instances, the shifting of the cathode ray tube with respect to the bezel has been objectionable and has been limited to some degree by gluing wedge-shaped inserts into the housing between the bezel and the enlarged end of the cathode ray tube. Typically, two inserts were inserted at spaced locations along each of the four sides of the enlarged end of the tube, resulting in eight inserts per video display, although in some cases fewer inserts were used. But the installation of the inserts involved considerable labor and skill to ensure that the tube shift would be minimized by this method.

SUMMARY OF THE INVENTION

In a video display terminal having a housing and a cathode ray tube mounted in the housing, there is provided shift restricting means for applying a selected level of force between mounting ears of the tube and the housing in a direction generally perpendicular to the central axis of the tube. In a preferred embodiment, angle brackets are mounted inside the housing between the enlarged end portion of the cathode ray tube and inside corners of the housing, and lateral force is applied between the angle brackets and the enlarged end portion of the tube for rigidifying the housing. The lateral force is applied by wedges mounted in the brackets for sliding against the mounting ears, and screws are coupled to the brackets for forcing the wedges against the mounting ears, thereby minimizing tube shift with respect to the bezel of the housing.

BRIEF DESCRIPTION OF THE DRAWINGS

Other objects and advantages of the invention will become apparent upon reading the following detailed description and upon reference to the drawings in which:

FIG. 5 is a cross-sectional view of the bezel along line 5—5 in FIG. 4;

FIG. 6 is a front view of an upper angle bracket used for mounting the cathode ray tube in the video display housing;

FIG. 7 is a side view of the angle bracket of FIG. 6;

FIG. 8 is a rear view of the angle bracket of FIG. 6;

FIG. 9 is a top view of the angle bracket of FIG. 6;

FIG. 10 is an enlarged sectional view of a portion of the angle bracket of FIG. 6 along line 10—10 in FIG. 9;

Figure 1:
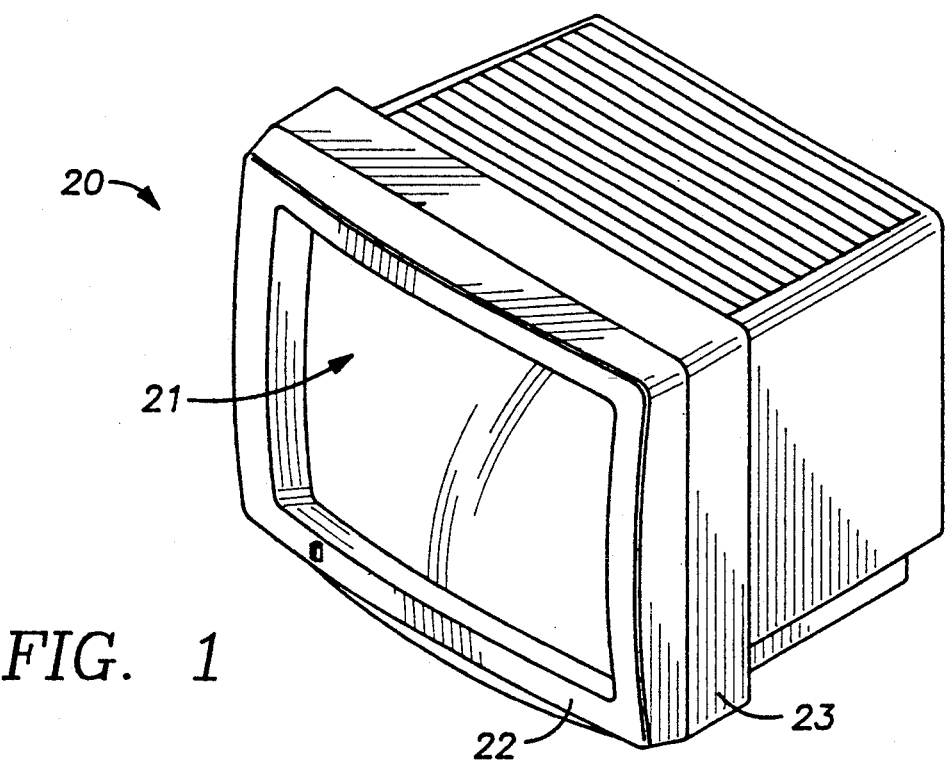
FIG. 1 is a perspective view of a video display terminal incorporating the present invention.

While the invention is susceptible to various modification and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

DESCRIPTION OF THE PREFERRED EMBODIMENT

Turning now to the drawings, there is shown in FIG. 1 a video display terminal generally designated 20 which incorporates the present invention. The video display terminal 20 has a cathode ray tube generally designated 21 mounted in a two-piece housing having a front bezel portion 22 and a rear portion 23 engaging the bezel. Preferably the bezel 22 and rear portion 23 are made of injection molded thermoplastic resin, such as polyphenylene oxide which is sold, for example, by the General Electric Company as NOREL PX4400 resin. The thermoplastic resin is easily molded to the desired shape and is especially light weight, durable and impact resistant.

Figure 2:
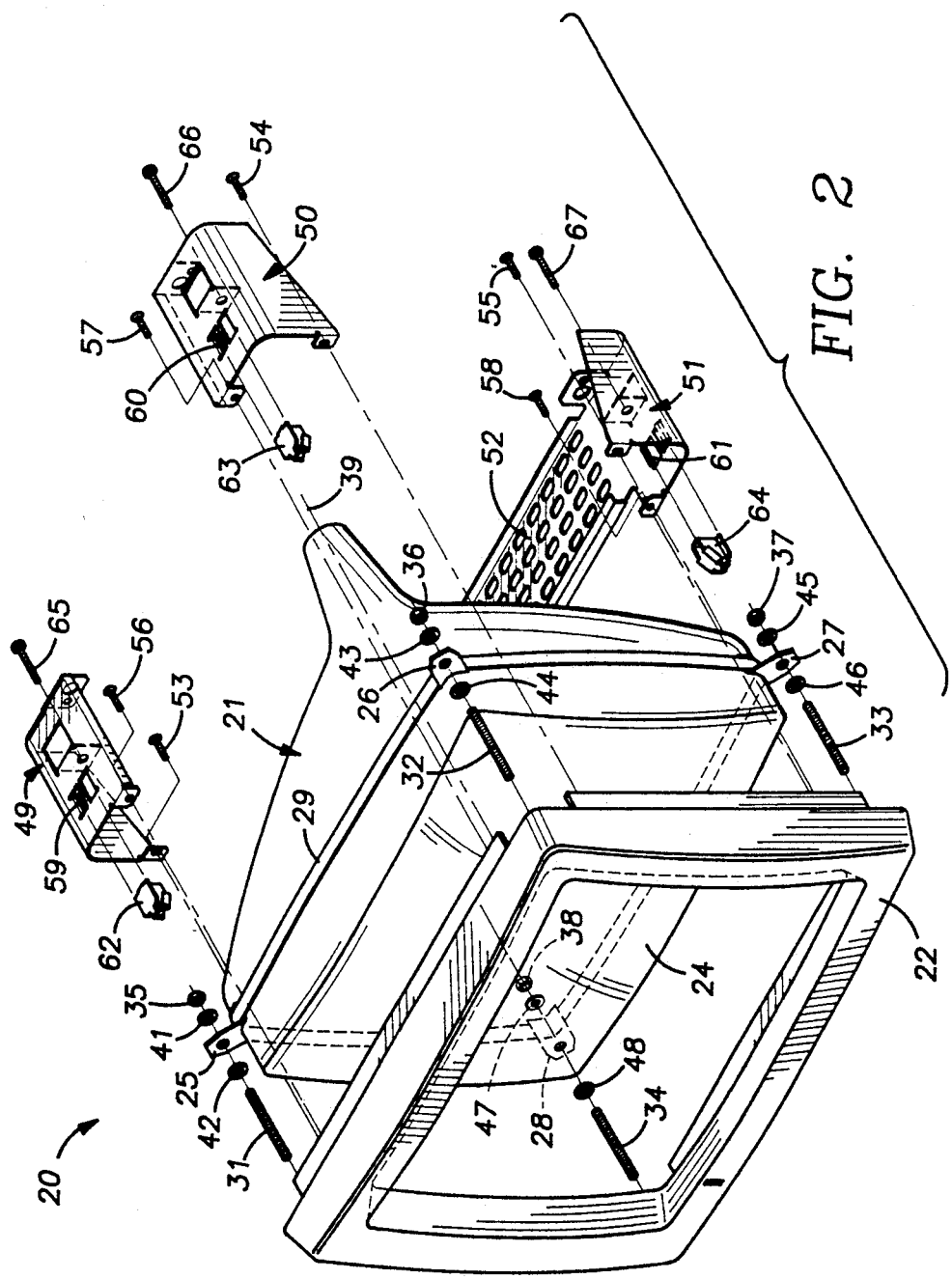
FIG. 2 is an exploded view showing the mounting of a cathode ray tube to a front bezel portion of the housing of the video display terminal of FIG. 1.

Turning now to FIG. 2, there is shown an exploded view illustrating the internal construction of the video display terminal 20. In FIG. 2, the rear portion of the housing 23 has been removed, and the cathode ray tube 21 is shown separated from the bezel 22. The cathode ray tube 21 has a glass portion with a display screen 24 at an enlarged end, and mounting ears 25-28 fastened by tensioned metal banding 29 to the glass portion.

To fasten the cathode ray tube 21 to the bezel 22, each mounting ear 25-28 is secured by a respective threaded stud 31-34 to a respective corner of the bezel 22. The studs, for example, are a quarter inch in diameter and have a 24 pitch thread. First, the studs 31-34 are screwed into the bezel 22, then the ears 25-28 are aligned over and engaged with the studs, and finally nuts 35-38 are threaded onto the studs to secure the mounting ears to the studs. This method of securing the mounting ears 25-28 to the bezel 22 prevents movement of the cathode ray tube 21 in the direction of the tube's central axis 39 which is generally perpendicular to the display screen 24, but some lateral movement of the mounting ears is permitted. Some lateral misalignment of the ears 25-28 with the threaded studs 31-34 is, in fact, desirable to account for rather imprecise lateral positioning of the mounting ears on the enlarged end of the cathode ray tube 21. Moreover, some lateral shifting of the mounting ears with respect to the threaded studs is to be expected during the handling of the video display terminal, and this lateral shifting is accommodated by a pair of washers 41-48 disposed on opposite sides of each mounting ear upon the respective threaded stud.

In accordance with an important aspect of the present invention, lateral shifting of the cathode ray tube 21 with respect to the housing is restricted by shift restricting means for applying a selected level of force between the mounting ears 25-28 and the housing 22 (and 23 in FIG. 1). As shown in FIG. 2, such shift restricting means is incorporated into an angle bracket 49, 50, 51 disposed at each corner of the housing. The lower angle brackets, only one of which 51 is shown in FIG. 2, are interconnected by a perforated rail 52 which provides support for some electrical components (not shown) of the video display terminal 20.

Each of the angle brackets 49-51 is secured by two screws 53-55 and 56-58 which are threaded into the bezel 22. The preferred shift restricting means includes a respective guide 59-61 formed in each angle bracket 49-51, a respective wedge 62-64 received in each guide, and a respective screw 65-67 threaded into each angle bracket for driving its associated wedge against an adjacent one of the mounting ears 25-28. Preferably the angle brackets 49-51 and the wedges 62-64 are formed from 16 gage (0.060 inch thick) cold rolled steel sheet metal and are finished with zinc and blue-bright chromate.

Figure 3:
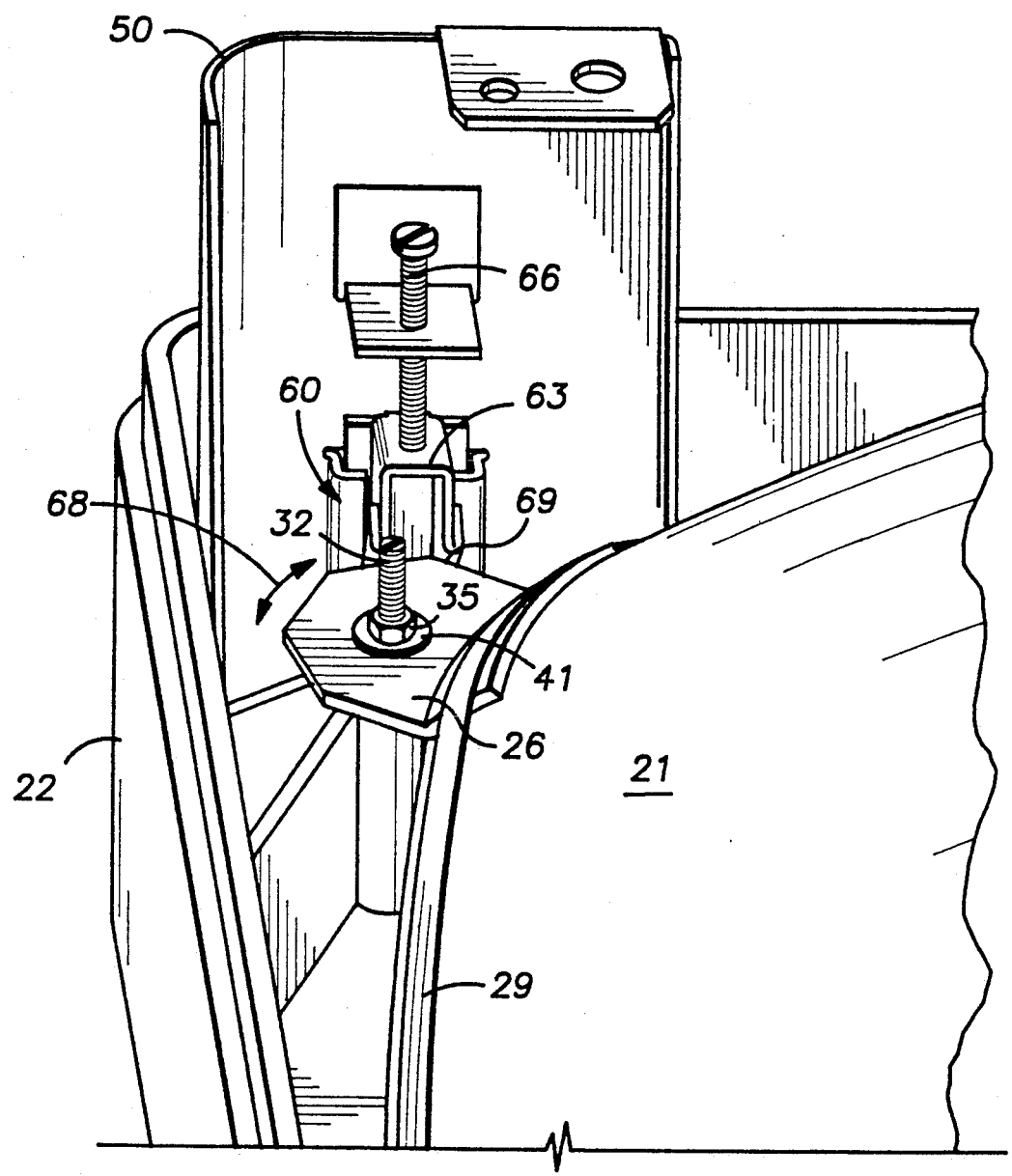
FIG. 3 is a perspective view illustrating shift restricting means for applying a selected level of force between mounting ears of the cathode ray tube and the video display housing in a direction generally perpendicular to the axis of the cathode ray tube.

The operation of the shift restricting means is more clearly discerned from the illustration in FIG. 3. As shown, the mounting ear 26 has been secured to the bezel 22 by the threaded stud 32 and the nut 35. In addition, the angle bracket 50 has been screwed to the bezel 22.

To restrict lateral motion of the mounting ear 26 in the direction of arrows 68, the wedge 63 is engaged in the slide 60 and is forced by the screw 66 to abut against the mounting ear 26 at a contact point 69. The screw is turned, for example, by a torque wrench to apply a selected level of force between the wedge 63 and the mounting ear 26. Therefore, the shift restricting means applies a selected level of force between the enlarged end of the cathode ray tube 21 and the housing of the video display terminal. In addition, the angle bracket 50 protrudes from the bezel 22 so that it abuts against the inside corner of the rear portion of the housing (23 in FIG. 1) when the rear portion is assembled onto the bezel 22.

Figure 4:
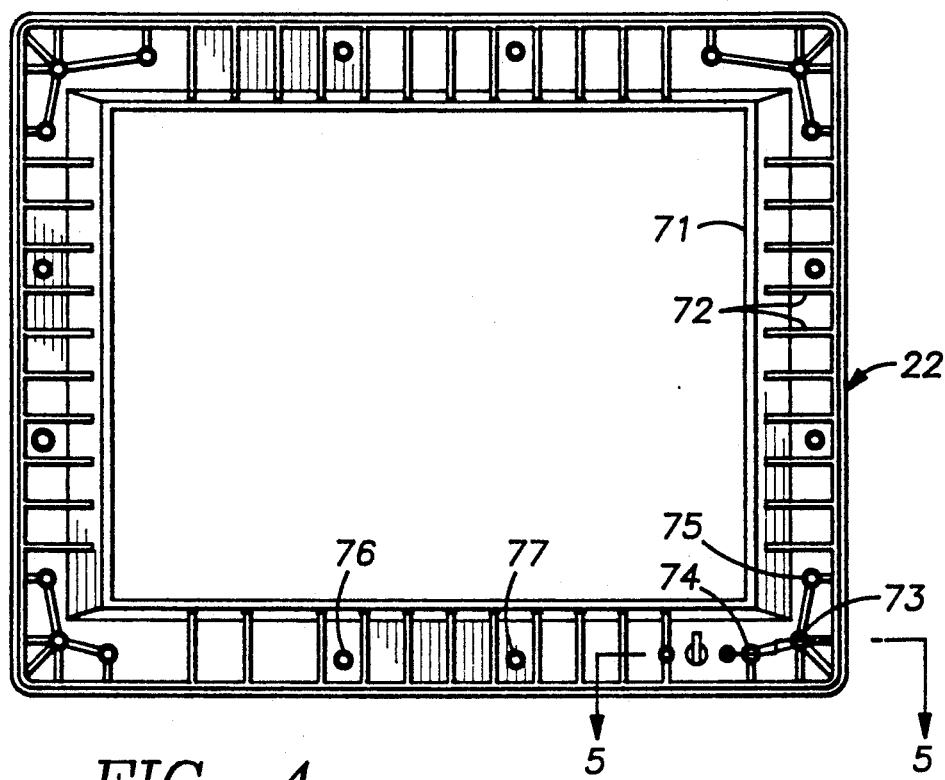
FIG. 4 is a rear view of the bezel portion of the video display housing.

Turning now to FIG. 4, there is shown a rear view of the bezel 22. The bezel defines a rectangular aperture 71 for the display screen of the cathode ray tube, and is injection molded with a number of reinforcing ribs 72. For securing the mounting ears of the cathode ray tube to the bezel, the bezel is injection molded with a boss in each of its four corners such as the boss 73 which receives the threaded stud 34 in FIG. 2. Also at each corner, there are disposed two bosses such as the bosses 74 and 75 which receive the screws for securing a respective one of the angle brackets to the bezel. Moreover, there are provided a pair of bosses such as the bosses 76 and 77 in the middle of each of the four sides of the bezel 22 for receiving screws (not shown) which fasten the rear portion of the housing (23 in FIG. 1) to the bezel.

Turning now to FIG. 5, the bosses 73 and 74 are shown in cross section. The bosses are cylindrical and hollow and receive respective threaded brass inserts 75 and 76. Preferably, the insert 75 is knurled and the insert 76 is tapered to hold the inserts into their respective bosses 73, 74.

Turning now to FIGS. 6 to 9, there are shown various views of the upper corner bracket 49. The bracket is mounted to the bezel (22 in FIG. 4) via two end flanges 81 and 82. The opposite end of the bracket also has a flange 83 which abuts against an inner surface of the rear portion of the housing (23 in FIG. 1) after assembly. To mount the adjusting screw (66 in FIG. 3), the bracket 49 is formed with an intermediate right angle bend 84 to which is mounted a threaded steel insert 85 which receives the respective adjusting screw (65 in FIG. 2).

The guide 59 for the wedge (62 in FIG. 2) is shown in FIGS. 9 and 10. It should be evident that the guide can be formed by a punching and stamping operation. A central portion 86 of the guide 59 includes a detent 87 that firmly engages the wedge (62 in FIG. 2) into the guide.

Figure 11:
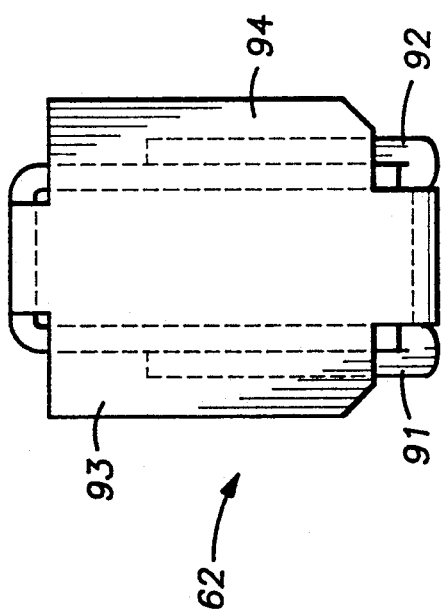
FIG. 11 is a top view of a wedge.
Figure 13:
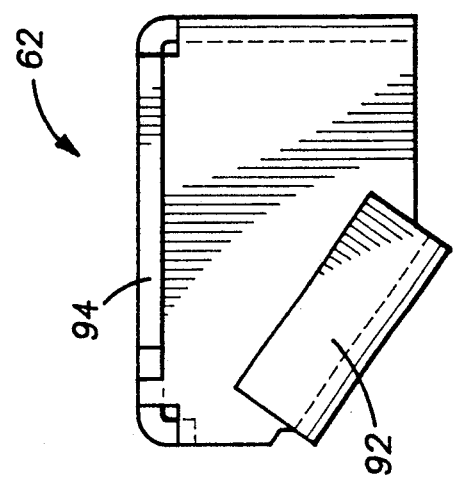
FIG. 13 is a side view of the wedge of FIG. 11.
Figure 12:
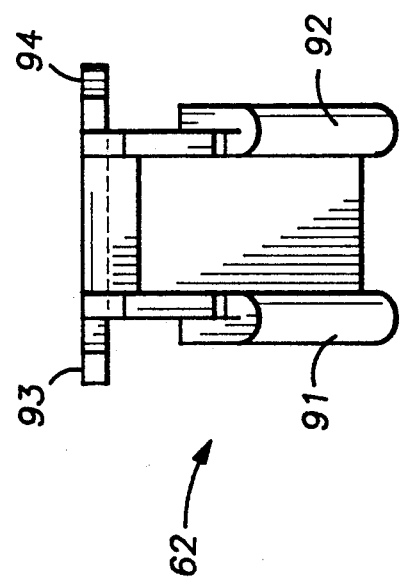
FIG. 12 is a front view of the wedge of FIG. 11.

Turning now to FIGS. 11 to 13, there are shown various views of the wedge 62. The wedge is formed by stamping and bending sheet metal. To ensure smooth contact between the wedge and its abutting mounting ear (25 in FIG. 2), the inclined edges of the wedge are formed by folds 91 and 92. For retaining the wedge in the guide (59 in FIG. 10), the top of the wedge has extending portions 93 and 94.

In view of the above, there has been described a means for restricting the lateral shifting of a cathode ray tube in a video display terminal. The shift restricting means is easily adjusted during the assembly process. In particular, the video terminal is assembled by laying the bezel 22 (see FIG. 2) face down, mounting the angle brackets 49-51 to the bezel, aligning the enlarged end 24 of the cathode ray tube 21 with the aperture of the bezel, and then securing the mounting ears 25-27 to the bezel by threading the nuts 35-37 to the studs 31-33. Then the wedges 62-64 are installed into the guides 59-61 in the brackets over the mounting ears 25-27, and the adjusting screws 65-67 are turned to drive the wedges to contact the mounting ears and obtain a selected amount of force between the mounting ears and the bezel. Despite the fact that the mounting ears are imprecisely located on the enlarged end of the tube, a simple adjustment of the screws 65-67 with a torque wrench precisely locates the wedges 62-63 into contact with the mounting ears 25-27 to minimize shifting of the cathode ray tube 21 with respect to the bezel 22.

The shift restricting means holds the cathode ray tube in its aligned position during shipping. It also helps support the load of the cathode ray tube which is typically cantilevered off four bosses in the bezel. In addition, the shift restricting means is incorporated into four angle brackets that abut the inside corners of the housing to rigidify the housing. External loads tending to deform the housing are applied to the mounting ears of the cathode ray tube to prevent these loads from being applied directly to the glass portion of the tube. The rigidification of the housing is especially useful in video display terminals which do not have an internal chassis.

We claim:

1. A video display terminal having a housing and a cathode ray tube mounted in said housing; said cathode ray tube having a display screen at an enlarged end, and a plurality of mounting ears disposed at said enlarged end; said display screen being perpendicular to a central axis of said cathode ray tube; said mounting ears being fastened to said housing to prevent movement of said cathode ray tube in the direction of said axis; wherein the improvement comprises shift restricting means for applying a selected level of force between said mounting ears and said housing in a direction generally perpendicular to said axis.

2. The video display terminal as claimed in claim 1, wherein said shift restricting means comprises wedges for applying said force between said ears and said housing.

3. The video display terminal as claimed in claim 2, wherein said shift restricting means further comprises brackets mounted to said housing, said brackets having guide means for guiding said wedges into contact with said ears.

4. The video display terminal as claimed in claim 3, wherein said housing is rectangular and said brackets are angled and brace inside corners of said housing.

5. The video display terminal as claimed in claim 4, wherein said brackets are made of metal, and said housing is made of plastic resin.

6. The video display terminal as claimed in claim 4, wherein said housing includes a bezel portion having an aperture aligned with said display screen, and a rear portion engaging said bezel portion, and said brackets are mounted in said bezel portion and abut against inside corners of said rear portion.

7. The video display terminal as claimed in claim 2, wherein said shift restricting means further comprises screws which abut against said wedges and are turnable for adjusting said selected level of force.

8. The video display terminal as claimed in claim 1, wherein said mounting ears are metal plates fastened by tensioned banding to a glass portion of said cathode ray tube, said metal plates being generally parallel to said display screen.

9. A video display terminal comprising, in combination:
a housing;
a cathode ray tube mounted in said housing;
angle brackets mounted inside said housing between an enlarged end portion of said cathode ray tube and inside corners of said housing; and
means for applying force between said angle brackets and said enlarged end portion of said cathode ray tube for rigidifying said housing.

10. The video display terminal as claimed in claim 9, wherein said housing includes a bezel portion receiving said enlarged end portion of said cathode ray tube, and a rear portion engaging said bezel portion, and wherein said angle brackets are received in said bezel portion and abut against inside corners of said rear portion.

11. The video display terminal as claimed in claim 9, wherein said angle brackets are made of metal, and said housing is made of plastic resin.

12. The video display terminal as claimed in claim 9, wherein said means for applying force includes wedges mounted in guides in said angle brackets, and screws for driving said wedges against the enlarged portion of said cathode ray tube.

13. The video display terminal as claimed in claim 12, wherein said cathode ray tube includes a glass portion and mounting ears fastened by tensioned banding to said glass portion, and said wedges abut against said mounting ears.

14. A video display terminal comprising, in combination, a housing and a cathode ray tube mounted in said housing; said cathode ray tube having a display screen at an enlarged end, and a plurality of mounting ears disposed at said enlarged end; said display screen being perpendicular to a central axis of said cathode ray tube; said mounting ears being fastened to said housing to prevent movement of said cathode ray tube in the direction of said axis; said housing being rectangular, and including a bezel portion defining an aperture aligned with said display screen, and a rear portion engaging said bezel portion; and said video display terminal further including angle brackets mounted to said bezel portion and extending generally parallel to said axis of said cathode ray tube between said cathode ray tube and said rear portion and bracing inside corners of said housing.

15. The video display terminal as claimed in claim 14, wherein said bezel portion and said rear portion are made of plastic resin, and said angle brackets are made of metal.

16. The video display terminal as claimed in claim 14, further comprising shift restricting means for applying a selected level of force between said mounting ears and said brackets in a direction generally perpendicular to said axis.

17. The video display terminal as claimed in claim 16, wherein said means for applying a selected level of force includes wedges mounted in said brackets for sliding against said mounting ears, and screws threaded in said brackets for forcing said wedges against said mounting ears.

18. A video display terminal comprising, in combination, a housing and a cathode ray tube mounted in said housing; said cathode ray tube having a display screen at an enlarged end, and a plurality of mounting ears disposed at said enlarged end; said display screen being perpendicular to a central axis of said cathode ray tube; said housing being rectangular, and including a bezel portion defining an aperture aligned with said display screen, and a rear portion engaging said bezel portion; said bezel portion and said rear portion being made of plastic resin; said mounting ears being fastened to said bezel portion; said video display terminal further including metal angle brackets mounted to said bezel portion and extending generally parallel to said axis of said cathode ray tube between said cathode ray tube and said rear portion and bracing inside corners of said housing; said video display terminal further including wedges mounted in said brackets for sliding against said mounting ears to restrict shifting of said cathode ray tube with respect to said housing in a direction generally perpendicular to said axis, and screws coupled to said brackets for forcing said wedges against said mounting ears.

19. The video display terminal as claimed in claim 18, wherein said brackets have been formed by stamping sheet metal, and slides for said wedges have been formed in the sheet metal by said stamping.

20. A video display terminal having a cathode ray tube and a housing for said cathode ray tube, said cathode ray tube having an enlarged end and a display screen and a plurality of mounting ears at said enlarged end, said housing having a bezel portion defining an aperture aligned with said display screen, wherein the improvement comprises wedges adjustably mounted to said bezel, and means for driving said wedges into contact with said mounting ears, to thereby restrict lateral shifting of said enlarged end of said cathode ray tube with respect to said bezel portion.

21. The video display terminal as claimed in claim 20, wherein the improvement further comprises angle brackets fastened to corner portions of said bezel portion, said angle brackets including guides receiving said wedges, and wherein said means for driving said wedges includes adjusting screws coupled between said angle brackets and said wedges.

22. A method of assembling a video display terminal having a cathode ray tube and a housing for said cathode ray tube, said cathode ray tube having an enlarged end and a display screen and plurality of mounting ears at said enlarged end, said housing including a bezel portion defining an aperture, said method comprising the steps of:

a) aligning the enlarged end of said cathode ray tube with the aperture of said bezel portion;

b) securing said mounting ears to said housing; and c) driving wedges to obtain a selected amount of force between said mounting ears and said housing.

23. The method as claimed in claim 22, wherein said step (c) of driving wedges to obtain a selected amount of force is performed by turning screws that drive said wedges, and applying a selected amount of torque to said screws.

* * * * *